United States Patent

[11] 3,570,652

[72] Inventors Howard Price
Kings Point;
Bela Szilagyi, Flushing, N.Y.
[21] Appl. No. 766,558
[22] Filed Oct. 10, 1968
[45] Patented Mar. 16, 1971
[73] Assignee International Patents & Development Corp.

[54] CONVEYOR
11 Claims, 3 Drawing Figs.
[52] U.S. Cl. .................................................. 198/181
[51] Int. Cl. .............................................. B65g 15/00
[50] Field of Search ......................................... 198/181, 204

[56] References Cited
UNITED STATES PATENTS
2,342,468   2/1944   Hallwood ..................... 198/181

3,381,800   5/1968   Everett ........................ 198/204

Primary Examiner—Richard E. Aegerter
Attorney—Sparrow and Sparrow

ABSTRACT: A conveyor arrangement for conveying containers intermittently so that the containers may be filled and emptied in sequence. A chain and sprocket drive operates in the plane of conveyance and furnishes the driving force for conveying the containers. The containers are attached to the sprocket chain, through clip members, and slide along tubular rails situated in a plane parallel to the chain and sprocket drive. Upright post members distributed along the conveying path support a guidance rail which guides the containers along the desired path. A limit switch actuated by the moving cans interrupts periodically the drive of the sprocket and chain, and permits the containers to be filled and emptied.

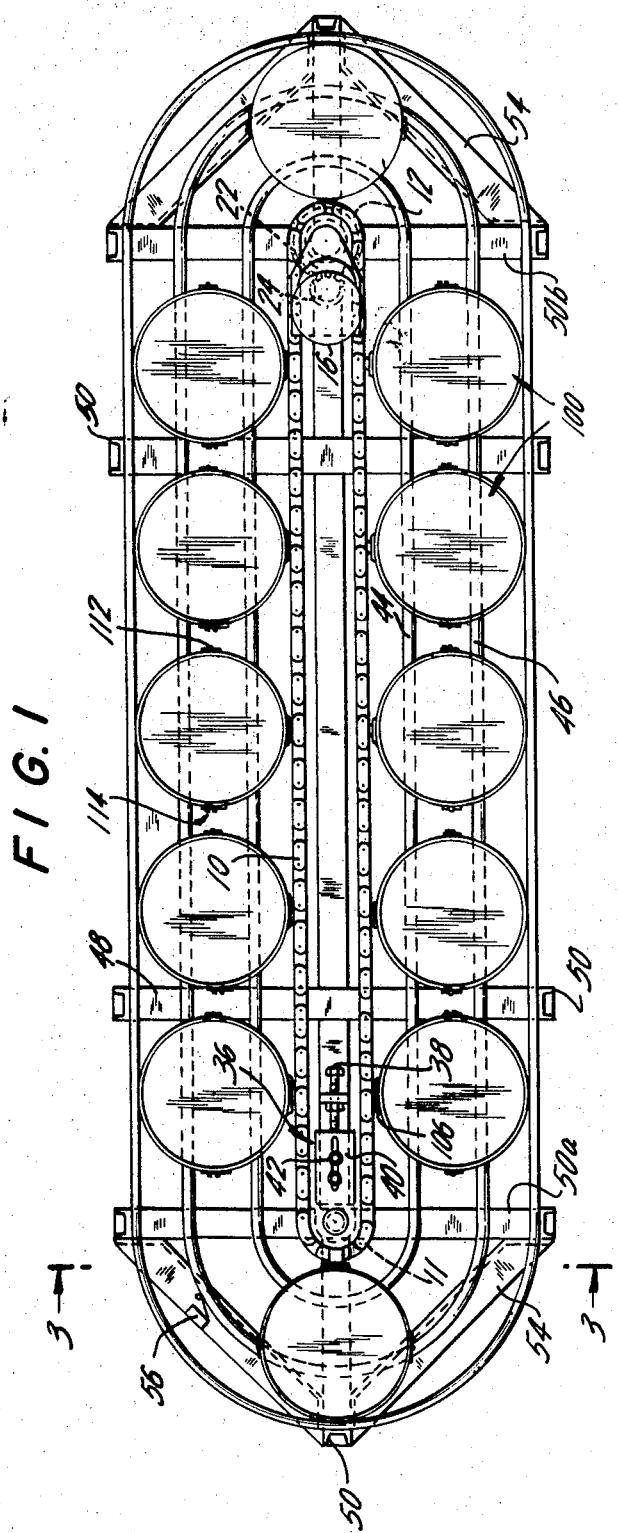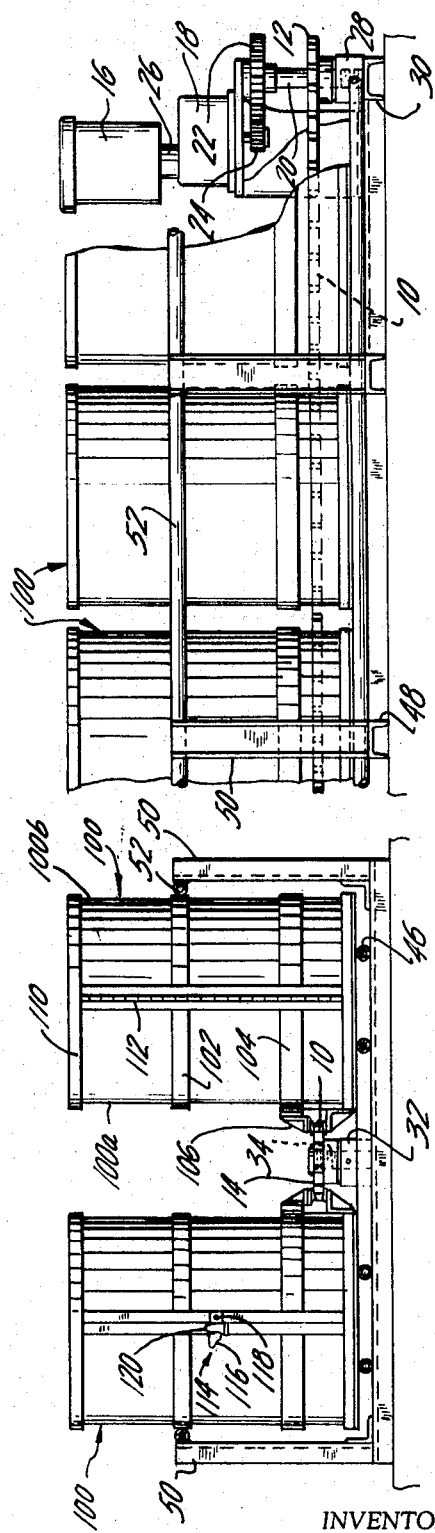

3,570,652

CONVEYOR

BACKGROUND OF THE INVENTION

In conveying containers of large dimensions, heretofore, conveyors have been of complex design requiring numerous movable parts and costly maintenance. Furthermore, such conveyors have been subjected to clogging, and were not generally adapted to conveying containers such as refuse cans which may spill refuse particles into the conveyor drive. In the past, such spillage of refuse into the conveyor parts generally led to clogging of the machinery and the stoppage of the conveyor for repairs. At the same time, due to their complex design, the conveyor arrangements were expensive to maintain in proper operating condition, and required a large initial investment cost for their construction. Accordingly, it is an object of the present invention to provide a conveyor system which is simple in design, has relatively few movable parts, is not subject to clogging and wear during operation, and may be maintained economically.

SUMMARY OF THE INVENTION

A conveyor arrangement for conveying intermittently containers of the refuse can type. The conveyor system of the present invention is adapted to operate particularly in conjunction with refuse compactors which eject compacted bales of refuse into containers for discarding. The conveyor has an endless sprocket chain driven by a sprocket mechanically coupled to a motor through a speed reduction device. The refuse cans to be conveyed slide along tubular rails on the bottom of the cans. The latter are equipped with holding clips attached to the chain which forces the cans to slide along the rails. The cans are constructed in the form of two hinged half sections, which may be parted to empty the cans and, at the same time, permit the cans to remain on the conveyor, during the emptying process. The cans are maintained upright and are guided along the conveying path through tubular rails mounted along the path and in contact with portions of the cans.

Various specific purposes, features and advantages will clearly appear from the detailed description given below taken in connection with the accompanying drawing which forms part of this specification and illustrate merely by way of examples certain embodiments according to the invention.

BRIEF DESCRIPTION OF THE DRAWINGS

In the following description and in the claims, parts will be identified by specific names for convenience, but such names are intended to be as generic in their application to similar parts as the art will permit. Like reference characters denote like parts in the several figures of the drawing, in which:

FIG. 1 is a top plan view of the container conveyor in accordance with the present invention;

FIG. 2 is an elevational front view of the container conveyor of FIG. 1;

FIG. 3 is an elevational end view taken along line 3—3 in FIG. 1 and shows the construction for securing the containers to the conveyor drive.

DESCRIPTION OF THE PREFERRED EMBODIMENTS

Referring to the drawing, a sprocket chain 10 is driven by a sprocket 12, in the conventional manner. The chain 10 and sprocket 12 are of conventional design for producing a positive drive, and is well known in the art. The sprocket 12 is driven by a motor 16, by way of a gear reduction unit 18. The shaft 20 of the sprocket 12 is driven by a gear 22 mounted on the shaft. The spur gear 22 is in mesh with a pinion 24 mounted on the output shaft of the gear reduction unit 18. The input of the gear reduction unit 18, is directly coupled to the motor shaft, through the coupling 26. The gear reduction unit 18 functions to produce an angular output speed considerably reduced from its input speed. Thus, the angular speed of rotation of the pinion 24 may be made to be considerably less than the angular speed of the shaft of the motor 16. Gear reduction units of this type accomplish such speed reduction through an assembly of gears in the form of a gear train, and are well known in the art. Accordingly, the gear reduction unit 18 will not be further described.

The shaft 20 to which the sprocket 12 is attached, is supported in an end-bearing 28 mounted on a base member 30. The latter may be in the form of a structural section such as a channel. At the other end, the chain 10 is wound about a driven sprocket 14 supported in a similar end-bearing 32. Thus, this sprocket 14 is mounted on a shaft 34, which, in turn, rotates in the end-bearing 32. The driven sprocket 14 may be denoted as the idler sprocket and the takeup sprocket since it provides for maintaining the chain taut during operation. The taut feature is accomplished through the takeup device 36. The latter provides for adjusting the position of the bearing 32 through the action of an adjusting screw 39 in contact with a block 40. When the set screws 42 are loosened, rotation of the screw 38 in a clockwise manner, when facing the head of the screw, will cause the latter to bear against the block 40 and move the latter so that it tends to increase the distance between the sprockets 12 and 14. As a result of this action of the screw 38, the chain is maintained in a stretched or taut condition, which is necessary for effective operation of the conveyor. After proper adjustment has been carried out of the takeup device 36, the set screws 42 are tightened, so as to prevent the block 40 from sliding back to its original position and thus impart looseness to the chain.

The base of the conveyor upon which the containers are conveyed, is constructed in the form of the rails 44 and 46 situated concentric with the sprocket chain 10. The rails 44 and 46 are of tubular cross section and rest upon cross members 48. These cross members maintain the tubular rails in proper place against the sliding action of the containers. The tubular rails 44 and 46 may be secured or attached to the cross members 48 by, for example, the process of welding. In this manner, a very simple type of assembly is realized. Further secured to the horizontal cross members 48, are vertical upright members 50. These members 50 are situated perpendicular to the horizontal members 48, and may also be secured to them through welding. The upright members 50 support a side rail 52 which functions as a guidance rail for the containers 100. The side rail or guidance rail 52 is also of tubular construction and may be welded unto the upright members 50. The side rails 52 contact the containers 100 at bands 102, at the exterior of the cans. These bands function to reinforce the wall of the can and, at the same time, provide for guidance of the can by bearing against the side rail 52, while the can is conveyed along the desired path.

The upright members 50 to which the side rails 52 are secured, may be in the form of structural steel channels, for the purpose of simplifying the design, and providing an economical assembly. Structural steel of different cross sections, may however, be equally applied to the upright members 50 and the cross members 48. The container or can 100 is also provided with a lower band 104 which is similar in construction to the band 102 and serves primarily to reinforce the wall of the can. End bands 108 and 110 are also provided on the can for the same purpose.

Driving clips 106 are attached to the bands 104 and 108, so that the chain 10 may drive the cans along the conveying path. Thus, the clips 106 have sandwiched between them the sprocket chain 10, and are situated between the rollers 11 of the chain. As a result, the clips 106 are moved along with the conveying chain, and thereby force the cans to slide upon the rails 44 and 46, in accordance with the motion of the chain. The end base members 54 serve to support the rails 44 and 46 at both ends of the conveyor drive. These base members 54 form a triangle with the cross members 50a and 50b, thereby providing a compact configuration for the conveyor. The limit switch 56 is provided in the path of the cans 100, in order to stop and start the motor drive for the chain, and thereby provide time intervals for filling and emptying the containers. The limit switch 56 is a simple electrical switching device which switches the power to the motor in the conventional manner, for the purpose of imparting intermittent motion to the same.

The container or can 100 is constructed in the form of two half sections 100a and 100b. These two half sections are hinged together at one of their ends by means of the hinge 112. The two halves of the can 100 are held together in a closed manner through a latch 114 located diametrically opposite to the hinge 112. The latch 114 is of simple design and construction which permits the two halves of the can to be readily parted or brought together. Thus, the latch 114 includes a lever 116 rotatable upon a pivot 118. In the closed position of the can, the lever 116 rests upon the angle-shaped member 120 secured to the half section of the can which is opposite to the section containing the pivot 118. To part the can, it is only necessary to lift the lever 116 from its seat on the member 120, and this action permits the two half sections to be freely parted. The entire assembly of the conveyor including the base cross members 48, upright members 50, base rails 44 and 46, and side rails 52, may all be of welded construction so as to provide an economical and compact design.

While the invention has been described and illustrated with respect to a certain preferred example which gives satisfactory results, it will be understood by those skilled in the art after understanding the principle of the invention, that various changes and modifications may be made without departing from the spirit and scope of the invention and it is intended therefor in the appended claims to cover all such changes and modifications.

I claim:

1. A conveyor arrangement for conveying containers on a desired path between different locations comprising, in combination, a plurality of containers to be conveyed along said path; base structure means for supporting said containers to be conveyed; base sliding rail means secured to said base structure means and interposed between said containers and said base structure means, said containers being slidingly movable on said base sliding rail means; continuous drive means supported on said base structure means; driving means for movably driving said drive means along the path on which said containers are conveyed; and container securing means for securing said containers to said drive means so that said drive means moves said containers slidingly on said base sliding rail means and along said path on which containers are desired to be conveyed.

2. A conveyor arrangement as defined in claim 1, wherein said drive means is a chain drive.

3. A conveyor arrangement as defined in claim 1 including a plurality of post members secured to said base structure means and distributed along said path; and side rail means supported by said post members and contacting said containers to maintain them guided along said path.

4. The conveyor arrangement as defined in claim 1 wherein said bast structure means comprises a plurality of cross members spaced from each other by said base rail means.

5. The conveyor arrangement as defined in claim 1 wherein said base rail means comprises an assembly of tubular members.

6. The conveyor arrangement as defined in claim 1 wherein said continuous chain drive means comprises a sprocket and chain drive.

7. The conveyor arrangement as defined in claim 5 wherein said sprocket and chain drive comprises further a driving sprocket and a driven sprocket; and a chain carried by said sprockets so that said chain is concentric with said desired path.

8. The conveyor arrangement as defined in claim 1 wherein said driving means comprises motor means and speed reducing means coupled between said chain drive means and said motor means for driving said chain drive means at a speed substantially less than the operating speed of said motor.

9. The conveyor arrangement as defined in claim 1 wherein each of said containers comprises two half sections hinged together.

10. The conveyor arrangement as defined in claim 8 including latching means on said container for latching said hinged two half sections to each other.

11. The conveyor arrangement as defined in claim 1 including switching means in the path of motion of said containers and controlling the operation of said driving means, said switching means being actuated by said containers for intermittent motion of said chain drive means.